United States Patent [19]

Conrad

[11] Patent Number: 5,119,640
[45] Date of Patent: Jun. 9, 1992

[54] FREEZE-THAW AIR DRYER

[76] Inventor: Richard H. Conrad, 950 Idylberry Rd., San Rafael, Calif. 94903

[21] Appl. No.: 602,412

[22] Filed: Oct. 22, 1990

[51] Int. Cl.$^5$ .................... F25B 21/02; F25D 21/00
[52] U.S. Cl. ..................................... 62/272; 62/3.4; 34/32; 55/440; 165/111
[58] Field of Search ............... 62/3.4, 3.3, 3.2, 93, 62/272, 324.2, 324.5; 34/32; 55/440; 165/111

[56] References Cited

U.S. PATENT DOCUMENTS

| | | | |
|---|---|---|---|
| 1,093,869 | 4/1914 | Leinert | 62/93 |
| 1,950,020 | 3/1934 | Bleibtreu | 55/440 |
| 2,215,486 | 9/1940 | Stone | 62/272 |
| 2,686,406 | 8/1954 | Pessoa | 62/93 |
| 4,287,724 | 9/1981 | Clark | 62/272 |
| 4,297,849 | 11/1981 | Buffet | 62/3.3 |
| 4,400,948 | 8/1983 | Moorehead | 62/3.3 |
| 4,615,176 | 10/1986 | Tippmann | 62/93 |

Primary Examiner—Albert J. Makay
Assistant Examiner—William C. Doerrler
Attorney, Agent, or Firm—Larry D. Johnson

[57] ABSTRACT

A freeze-thaw air dryer utilizes a heat pump to remove moisture from air by cooling the air to below the freezing point of water, causing the water to pass directly from the vapor state to the solid state and thereby to be removed from the flow of air. The vapor frozen on the cold surfaces is periodically thawed by either turning off or reversing the heat pump, and the condensate and thawed ice are automatically drained out of the device without interruption of the airflow. The geometry of the cold surfaces and the generally centripetal airflow path are designed expressly to cause a buildup of ice without impairing efficiency or blocking the airflow.

19 Claims, 8 Drawing Sheets

FREEZE-THAW AIR DRYER

BACKGROUND OF THE INVENTION

1. Field of the Invention

This invention relates generally to air dryers, dehumidifiers and related devices, and more specifically to an improved freeze-thaw type of air dryer.

2. Description of the Prior Art

Air dryers and dehumidifiers are well known. Many air dryers use a cooling or refrigeration system to chill a flow of air to below its dew point, and then collect and remove the water that condenses on the cooling surfaces. Other systems remove water from air by cooling the air to below its freezing point, thereby freezing the condensed water as ice, and then periodically warming to thaw the ice into liquid water for removal. However, as ice builds up on the freezing surfaces, it immediately begins to reduce freezing effectiveness and/or airflow. The prior art type of freeze-thaw air dryer is particularly prone to inefficiencies from ice build-up and airflow restriction, and requires separate airflow paths during the freezing and thawing cycles.

SUMMARY OF THE INVENTION

The freeze-thaw air dryer of this invention produces air dried to a lower dew point than prior art air cooling type driers, and because it is purposely designed to freeze it avoids their temperature control and icing problems. The geometry of the cold surfaces and of the generally centripetal airflow path of the present invention are designed expressly to cause a buildup of ice without impairing efficiency or blocking the airflow, and to provide automatic drainage of condensate and thawed ice without requiring any interruption of airflow or diversion to a separate airflow path as in the prior art. In addition, this invention is extremely compact, can be constructed without any moving parts, and does not require the use of Freon or other refrigerants which destroy the ozone layer.

The present invention utilizes a cold source or heat pump such as a thermoelectric Peltier module to remove moisture from air by cooling the air to below the freezing point of water, causing the water to pass directly from the vapor state to the solid (frozen) state and thereby to be removed from the flow of air. The vapor frozen on the cold surfaces as ice is periodically thawed by either turning off or reversing the heat pump. The condensate and thawed ice are automatically drained out of the device. Optionally included is a pre-cooler which utilizes the coldness of the exiting dry air to pre-cool and thereby remove some initial moisture, as either ice or liquid condensate, from the entering ambient air.

The air dryer of the present invention operates by means of a freeze-thaw cycle which consists of alternate periods of freezing and thawing, where the thawing can be done by either passive or active heating. In the simplest use of this invention the thaw portion of the cycle is passive, i.e., a freeze-off cycle is used. For example, in applications where dry air is used for only an hour or two at a time, with at least ½ hour between uses (such as in drying air to be used for generating ozone for a spa, where the spa and ozone generator are on for spaced one hour periods), while the system is on the air is cooled to a dew point of between $-10$ and $+20$ degrees F., and after the system is turned off thawing will occur by itself, provided that the ambient temperature is above freezing. In an active thaw, or freeze-heat embodiment, the invention alternately cools air to below freezing and then warms the cold surfaces to just above freezing approximately once per hour or half-hour. This cycling may be controlled by either 1) a timer; 2) a detector which monitors either the temperature or the humidity of the exiting air; 3) a differential pressure sensor; or 4) an airflow sensor. In some cases a timer with a fixed timing cycle may be less desirable than the other options because it would not automatically compensate for changes in flow rate, humidity or temperature of the ambient air, or for the temperature of the water or air being used to cool the hot side of the Peltier module, all of which would be automatically compensated for by temperature or humidity sensing of the exiting air. The warming/thawing typically takes one minute or less, during which time drainage occurs automatically. Then cooling is immediately resumed. For most of the cycle the dew point of the exiting air is below 10 degrees F, and even during the short heating period the dew point does not exceed 40 degrees F (whereas 40 degrees F. is the full-time operating dew point of most prior art dryers).

Cooling may be implemented by a thermal means or cold source such as a thermoelectric or Peltier heat pump which cools on one side (the "normally cold side") and heats on the other side (the "normally hot side") when the DC current flows through it in the "cooling direction". When the DC current is reversed to flow in the opposite or "heating direction", the normally cold side becomes hot and the normally hot side becomes cold. Thus thawing can be carried out by reversing the polarity of the DC voltage supplied to the thermoelectric module. A heat exchanger utilizing liquid or air as a heat-exchanging fluid, or a heat sink utilizing conduction to a large mass serves to remove heat from the normally hot side during the cooling or freezing portion of the cycle, and to warm the normally hot side when it becomes cold during the thawing portion of the cycle. The use of a thermoelectric module makes the freeze-thaw cycle of the present invention very practical to implement for small airflows up to a few cubic feet per minute, and provides a highly reliable, silent and extremely compact device which does not require a compressor and does not need maintenance. In the embodiment for negative pressure operation which utilizes a drain trap, there are no moving parts at all and no valves or small orifices to stick or to clog.

The prior art device of Moorehead (U.S. Pat. No. 4,400,948) also utilizes freezing surfaces to dry air and a thermoelectric module whose polarity is reversible to provide a thaw interval, but that patent discloses a very narrow air path of less than 0.070 inches, a fan, and a timer-actuated moisture removal system of re-directing all of the air from its original exit path to a second exit path by means of a solenoid valve during a thaw cycle. None of the latter features are required by the present invention, and in particular, the present invention provides moisture removal through a drain without having to re-direct the main flow of air, thus maintaining a continuous flow of dried air to the output throughout the freeze-thaw cycle while allowing continuous drainage. Additional improvements of the present invention over the prior art are a non-linear geometry with cold source(s) located at a radial center, a generally centripetal airflow path, a centripetally decreasing temperature gradient of the surfaces of the cooling array which causes the air to become progressively colder and drier as it flows inward, an extraction of the air at a centrally located coldest/driest point, and drainage of moisture away from the air extraction point. These improvements greatly increase the efficiency of operation and the dryness of the exiting air.

The present invention provides for drainage of liquid condensate and thawed ice by the following means:

1) In systems operating with positive pressure in the dryer, a solenoid drain valve opens automatically for a few seconds at the end of the thawing period, allowing liquid water to drain from the device. Alternatively, a float valve may be employed to release the water, or a very small portion of air can be allowed to continuously bleed out through the drain, thus allowing a continuous drainage of liquid water (these latter two methods are less reliable because of potential clogging).

2) In systems operating with negative pressure in the dryer, the liquid water is continuously drained through a drain tube which includes any of the following means, either singly or in combination, to prevent air from being drawn into the device through the drain tube:

a drain tube containing a loop or trap which serves to trap a volume of water, with the height of the water column being great enough to overcome the negative air pressure;

a one-way check valve at the end of a straight drain tube;

the above-mentioned loop but additionally including a float valve in the reversed portion of the loop; or a float valve at the end of the drain tube with a float which is too heavy to be lifted by the negative air suction.

Thus the present invention does not require an airflow to purge or drain moisture, rather, it preferably utilizes gravity drainage, with, in negative pressure applications, an optional check, solenoid, or float valve to prevent a flow of air up through the drain tube.

The present invention provides performance which is superior to the prior art because in addition to not requiring a shunting of the airflow in order to drain moisture (shunting interrupts the output flow of dry air), it introduces a novel design which optimizes the geometry of the cooling surface area and its relationship to the location of the cold source or Peltier module by causing the largest percentage of the water to be removed from the airflow at the entrance of the flow by outer cooling element(s) of the cooling array, which have a greater surface area and wider flow spaces to accommodate more buildup of ice; whereas the inner cooling elements of the cooling array have smaller surface areas in closer proximity to the cold source with a greater ratio of metal mass to metal surface and narrower flow spaces towards the exit, which presents the coldest surfaces to the airflow near the end of the flow path. This design results in greatly enhanced performance with longer operation between thaw cycles because most of the moisture has already been removed by the time the air reaches the coldest surfaces where ice buildup would impair heat exchange more critically.

Two additional benefits of the design of the present invention allow the Peltier module to cool the innermost surfaces or elements to lower temperatures, resulting in a lower dew point of the exiting air:

1) the outer elements with their larger surfaces and higher heat load are in further proximity from the concentrically located module than are the innermost elements, allowing the module to draw more heat directly from the innermost elements than it could otherwise;

2) the outer elements pre-cool the air before it reaches the innermost surfaces, allowing a steeper temperature gradient (progressively colder towards a central axis or point) to be established and a lower exiting dew point to be maintained (rather than a higher average temperature resulting throughout as occurs in prior art devices).

The heat conducting freeze-thaw surfaces which provide for heat flow between the cold side of the thermoelectric module and the air in the airflow spaces are fabricated preferably from a metal of high thermal conductivity such as aluminum or copper and preferably contain generally parallel cooling surfaces which are arranged so as to define a convoluted internal volume with a generally serpentine airflow path. This simultaneously provides a large ratio of internal surface area to air volume for maximal heat transfer between the metal surface and the air, constrains the airflow to a convoluted path which provides continuous mixing of the boundary layer for maximum contact of the air with the metal surfaces, and provides a baffling effect to enforce plug flow (in contrast to batch or mixed-volume flow) for maximum efficiency.

With the use of an optional pre-cooler, the bulk (70 to 80%) of the water vapor contained in the air may be drained out initially as liquid water without having to be frozen and re-thawed. This results in a higher efficiency and allows less frequent thawing. Pre-cooling does not use additional energy because it utilizes the exchanged "waste" cold from the sub-freezing exiting dry air. It provides that the airflow impinging on the cooling array is near 32 degrees F instead of being at ambient temperature, thus enabling the thermoelectric module to maintain the whole cooling array at lower temperature than it would otherwise. The largest fraction of the moisture remaining after the pre-cooler is then frozen onto the first freezing surfaces that the airflow contacts, and the preferred design of the present invention presents the largest surface areas and flow gaps to the incoming air, resulting in a greater ice capacity before ice thickness impairs heat exchange or airflow. Thus the present invention may be embodied as a multi-stage dryer with a first stage pre-cooling and condensing, and then the freezing array removing most of the remaining moisture through a kind of reverse sublimation, with a temperature gradient going gradually from a sub-freezing temperature on the perimeter of the array to even lower temperatures towards the center of the array, with the air exiting the array near a central coldest point.

The design of the present invention minimizes parasitic heat flows (cold losses) by utilizing compact freezing arrays which present a minimum of surface area to the outside and are suspended inside a housing of (preferably) low thermal conductivity, with a minimum of contact with the housing.

In one of its embodiments, this invention effectively has four stages:

1) an optional air distribution manifold which also functions to prevent loss of cold through the outer walls more efficiently than insulation;

2) an optional pre-cooling stage cooled by heat exchange with the sub-freezing exiting dry air (this stage can remove up to 80% of the moisture);

3) a primary freezing stage consisting of an array of surfaces cooled by one or more main thermoelectric modules; and 4) an optional secondary and colder freezing stage consisting of a central cold finger or cooling array cooled by a series cascade of additional thermoelectric modules.

Simpler embodiments can utilize only stage 3, or stage 3 in combination with one or more of any of the other optional stages. An additional unique feature of any embodiment utilizing stage 4 is that the thaw cycles of stages 3 and 4 can be staggered to provide less of a rise in dew point of the output during thawing. The above features and improvements result in a much lower dew point during the freezing portion of the cycle, and a much greater freeze/thaw time ratio than prior art devices.

The present invention could be used with compressed air to obtain the lowest possible atmospheric pressure dew point (the higher the pressure at which air is cooled, the drier the air will be once it is returned to atmospheric pressure), but in many applications, because of its sub-freezing temperatures, the present invention lowers the dew point sufficiently without the use of an air compressor. For applications using dry air at low pressure, either at slight suction or near ambient pressure such as is usually used in the generation of ozone, the freeze-thaw dryer described herein could be used without a compressor to supply pre-dried air to a downstream disposable desiccant (thereby extending the useful life of the desiccant over that of a desiccant used alone by a factor of 10 to 100 times) to supply the −60 degree F. dew point air required by ozone generators. Such a system would be totally fail-safe, since the passive desiccant would act as an absolute backup.

This means of supplying very dry air is in great contrast to the twin tower regenerative desiccant dryers that are now in common use, which are not highly reliable and need yearly servicing, including the periodic renewal of expensive desiccants and the cleaning of desiccant fines out of valves by qualified service personnel. These regenerative desiccant driers also require the use of an air compressor, and they waste a good part of the compressor's output air for purging. Thus they need a larger compressor than would otherwise be necessary, and along with its lack of reliability, its air tank, controls, gauges, regulators, power usage, noise and yearly maintenance requirements, the compressor itself is a great additional complication and expense. Twin tower regenerative desiccant driers are also very expensive, partly because they are built to withstand the high pressure required for their operation.

Comparatively, the freeze-thaw air dryer of this invention can be operated at any pressure, either positive or negative. It can be constructed rather inexpensively, especially if it is to be used only for low pressure. Without a compressor, and with the pressure near ambient, a dew point of 0 degrees F. or lower can be maintained by the freeze-thaw dryer. Therefore only a very small amount of desiccant drying is necessary downstream, since most (typically 96%) of the water is removed by the time the 0 degree F. dew point is reached, and the remaining drying by the downstream desiccant to −60 degrees F. dew point involves only a very small amount of water. Thus, for ozone air drying applications, where a venturi is used to pull the air through the system under negative pressure, a compressor could be completely eliminated, and the dryer could be built without having to be pressure resistant. For example, even with a worst case freeze/thaw time ratio of 10/1, with 27 minutes of air output having a dew point averaging +10 degrees F. and three minutes having a dew point between 32 and 40 degrees F., the life of the desiccant downstream would be extended about ten times. If desired, the life of the desiccant could be further extended (to 250 times) by using cascaded heat pump modules to achieve lower temperatures and/or by increasing the air pressure.

A desiccant downstream from the dryer may be used not only to further lower the dew point of the airflow, but also to maintain a constant dew point during the thawing and re-cooling portions of the cycle. Alternatively, two or more driers can be plumbed together, with automatic valving to allow alternate thawing operation so that the dew point of the output air can continuously remain below freezing. Two identical devices of the present invention, each capable of its own freeze/thaw cycle, can be automatically synchronized in operation by either a timer or by the temperature, humidity, air-flow or pressure of the exit air from each device through an electronic circuit which switches the solenoid valves. These units can be alternately valved into the air line, where a first unit thaws and then cools down, while a second unit freezes the air. When ice builds up in the second unit to a point where the controlling sensor is activated, valves re-route the airflow to the pre-cooled first unit, and the second unit is then thawed. Thawing is much faster than the cooling portion of the cycle, so that before the first unit accumulates too much ice, the second unit will be completely thawed and pre-cooled.

One of the unique features of the freeze-thaw air dryer of the present invention is that when using two of the devices together with synchronized alternating thawing cycles, they can be connected in series to provide an enhanced efficiency, a lowered dew point and an increased air drying capacity. To accomplish this, the thawing and pre-cooling first unit is employed in front of the second unit to simultaneously remove moisture from and to pre-cool the air, the air then going into the second unit which can now more efficiently freeze most of the remaining moisture out of the air. Either a timer or ice build-up in the second unit eventually triggers an automatic valve(s) switch-over which effectively reverses the positions and functions of the first and second units. Both units could be freezing at the same time for a portion of the cycle.

DETAILED DESCRIPTION OF A PREFERRED EMBODIMENT

Figure 1A:
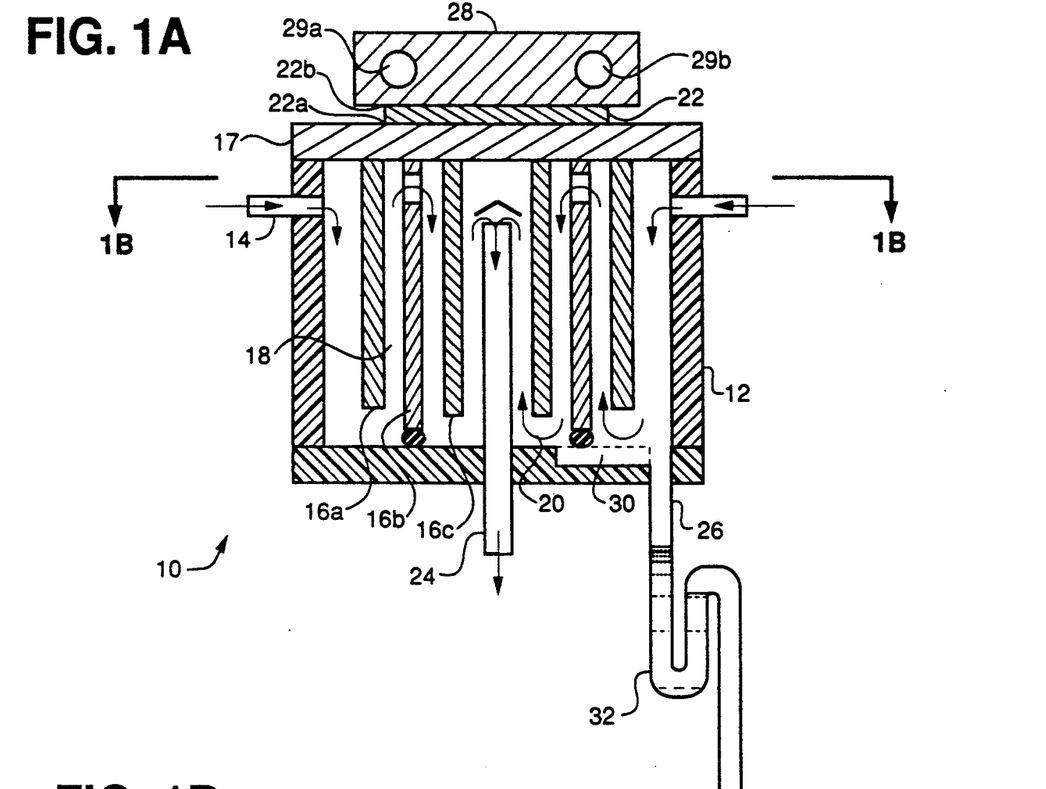
FIG. 1A is a side elevation cross-sectional view of a simple embodiment of the freeze-thaw air dryer of this invention, illustrating a housing member having one or more air inlets, a freezing surface defining an internal volume and a generally centripetal airflow path, a thermoelectric module (heat pump) adjacent the freezing surface, a dry air extraction outlet, and a liquid drain.

FIG. 1A is a side elevation cross-sectional view of a simple embodiment 10 of the freeze-thaw air dryer of this invention, illustrating a housing member 12 having an air inlet 14, a freezing surface array 16a–c, 17 defining an internal volume 18 and a generally centripetal airflow path 20, a thermoelectric module (heat pump) 22 adjacent freezing surface plate 17 to provide a generally centripetal temperature gradient to the freezing surface, a dry air extraction outlet 24, and a liquid drain 26. Here, in fact, a plurality of air inlets 14 deliver incoming air towards the freezing surfaces, which comprise a series of concentric tubes with staggered ends and/or staggered openings, thereby defining a convolute airflow path 20 towards the center of the unit. These tubes may be fabricated from copper or other high thermal conductivity material, and could of course be of any other cross-sectional shape (e.g., square, rectangular, hexagonal, etc.). Thermoelectric module 22 has a normally cold side 22a and normally hot side 22b. Heat exchanger 28 with heat exchanging fluid entrance 29a and exit 29b may be used to improve the thermal dissipation from module 22. Housing 12 may include a drainage groove 30 for delivering condensate and thawed ice towards drain 26. In this and all subsequent embodiments, the housing is preferably tilted five to twenty-five degrees toward the drain to improve such drainage. The drain further preferably includes some means to prevent air passage through it, such as a trap 32 designed to remain full of liquid.

Figure 1B:
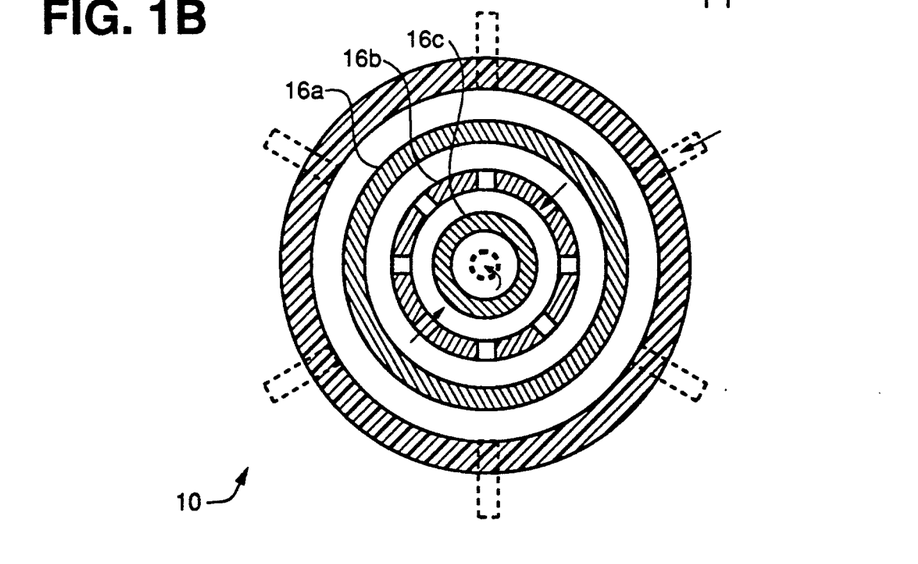
FIG. 1B is a top plan cross-sectional view of the freeze-thaw air dryer of FIG. 1A, illustrating the concentric tubes of the freezing surfaces defining the generally centripetal airflow path, this view taken along line 1B-1B of FIG. 1A.

FIG. 1B is a top plan cross-sectional view of the freeze-thaw air dryer 10 of FIG. 1A, illustrating the concentric tubes 16a–c of the freezing surface array defining the generally centripetal airflow path, this view taken along line 1B-1B of FIG. 1A.

Figure 2:
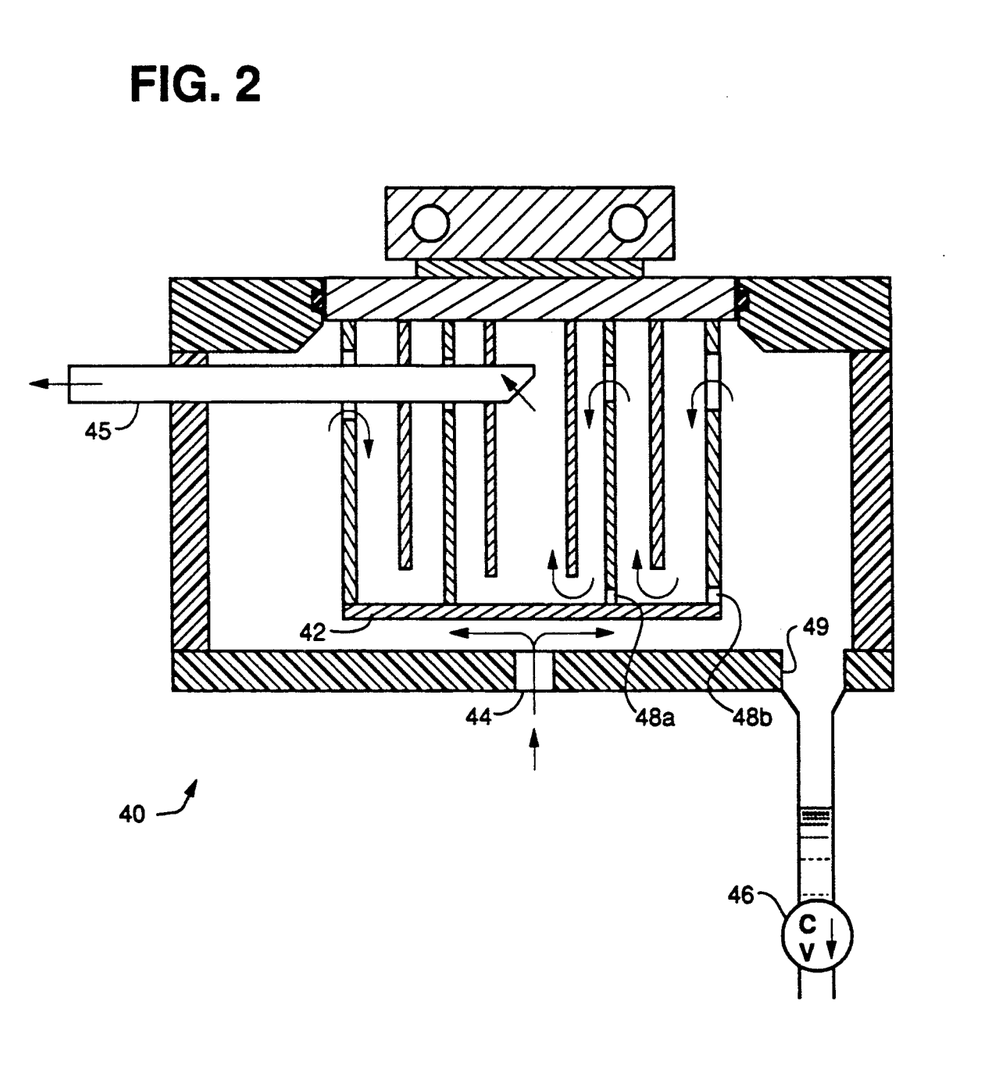
FIG. 2 is a side elevation cross-sectional view of a modified embodiment of the freeze-thaw air dryer of this invention, illustrating the addition of a bottom freezing surface and a single air inlet in the bottom of the housing which together provide a planar incoming air distribution means, and a drain check valve.

FIG. 2 is a side elevation cross-sectional view of a modified embodiment 40 of the freeze-thaw air dryer of this invention, illustrating the addition of a bottom freezing surface 42, a single air inlet 44 in the bottom of the housing, a horizontal dry air extraction tube 45, and drain check valve 46. Inclusion of bottom plate 42 allows all of the surfaces within the internal volume to be freezing surfaces, and thus provides more efficient cooling of the air throughout its flow path. Together with air inlet 44 it also provides a planar incoming air distribution means for distributing the incoming air evenly within the housing. Drainage ports 48a, 48b deliver thawed ice towards the drain. Optionally, in all embodiments, the drainage ports/openings/channels/grooves (but not the drain outlet 49) are preferably configured to retain a small amount of water within themselves at locations where this water will freeze and block the passage of air through them during the freezing portion of the cycle. This will prevent any shunting of incompletely dried air around some of the freezing surfaces, and yet will allow the desired drainage during the thaw portion of the cycle. Check valve 45 prevents ambient air from being aspirated into the housing through the drain.

Figure 3A:
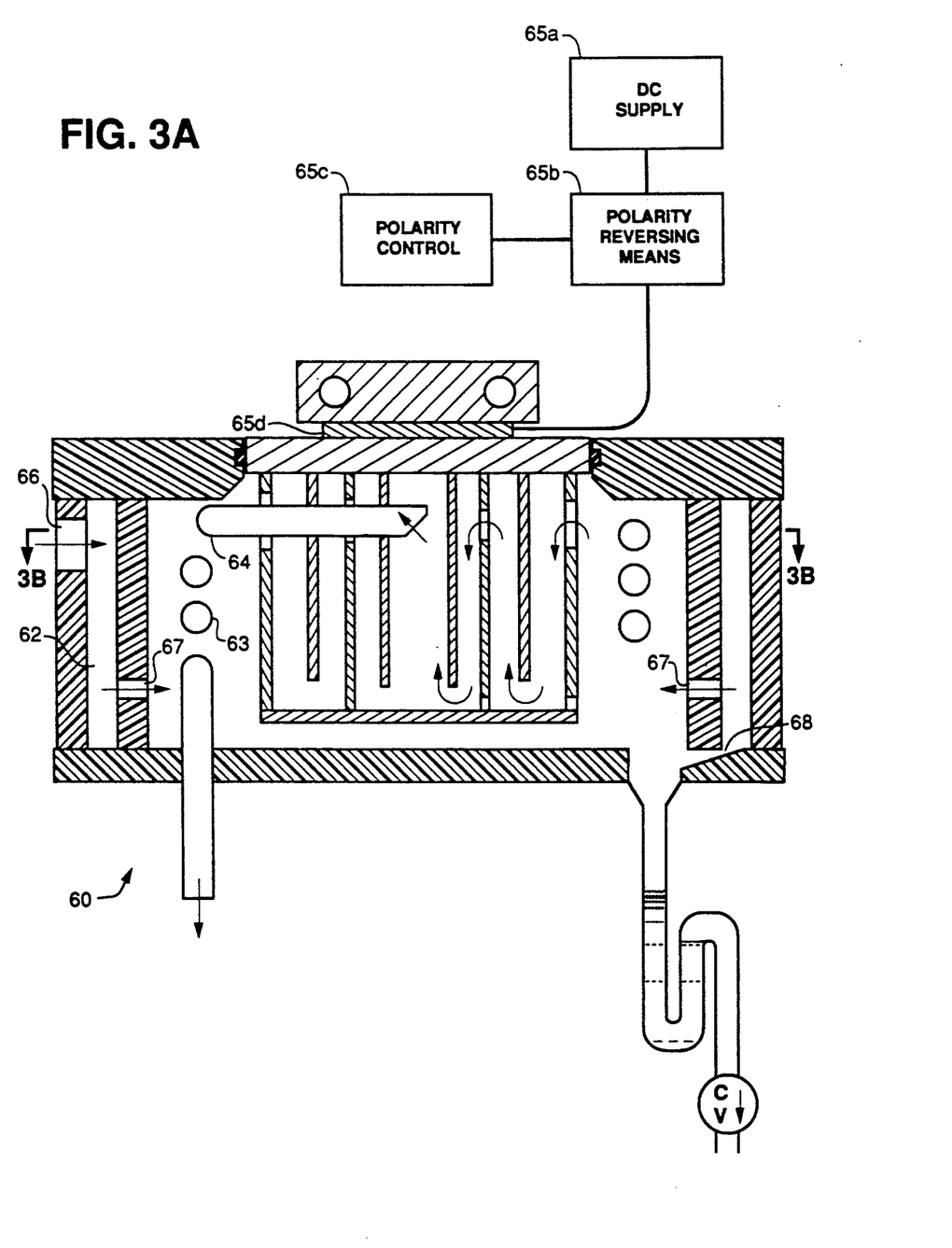
FIG. 3A is a side elevation cross-sectional view of a modified embodiment of the freeze-thaw air dryer of this invention, illustrating the addition of an annular incoming air distribution manifold, a pre-cooling coil formed from the dry air extraction outlet tube, a DC supply, a polarity reversing means, a polarity control and a drain containing both a trap and a check valve.

FIG. 3A is a side elevation cross-sectional view of a modified embodiment 60 of the freeze-thaw air dryer of this invention, illustrating the addition of an annular incoming air distribution manifold 62, an air pre-cooling means 63 formed as a coil from the dry air extraction outlet tube 64, DC power supply 65a for supplying power to thermoelectric module 65d, polarity reversing means 65b, polarity control 65c which may comprise a timer or a temperature, humidity, differential pressure, or airflow sensor, and a drain containing both a trap and a check valve. Annular air distribution manifold 62 permits use of a single air inlet 66 to the housing, and then delivers the air evenly around the freezing surfaces via a plurality of distribution holes 67. The annular manifold also functions to prevent loss of cold through the outer walls more efficiently than insulation. The pre-cooling means could be a helical coil as shown, or a flat coil underneath the array with incoming air entering from below, or any other suitable configuration. Drainage gap/groove 68 allows any condensate which may form within the manifold to reach the drain. The use of a drain check valve together with a drain trap provides a fail-safe backup: the check valve serves, at start-up when there is no water in the trap loop, to prevent a negative pressure within the housing from drawing air up through the drain into the housing; and the trap provides a safety back-up in case the check valve sticks or leaks.

Figure 3B:
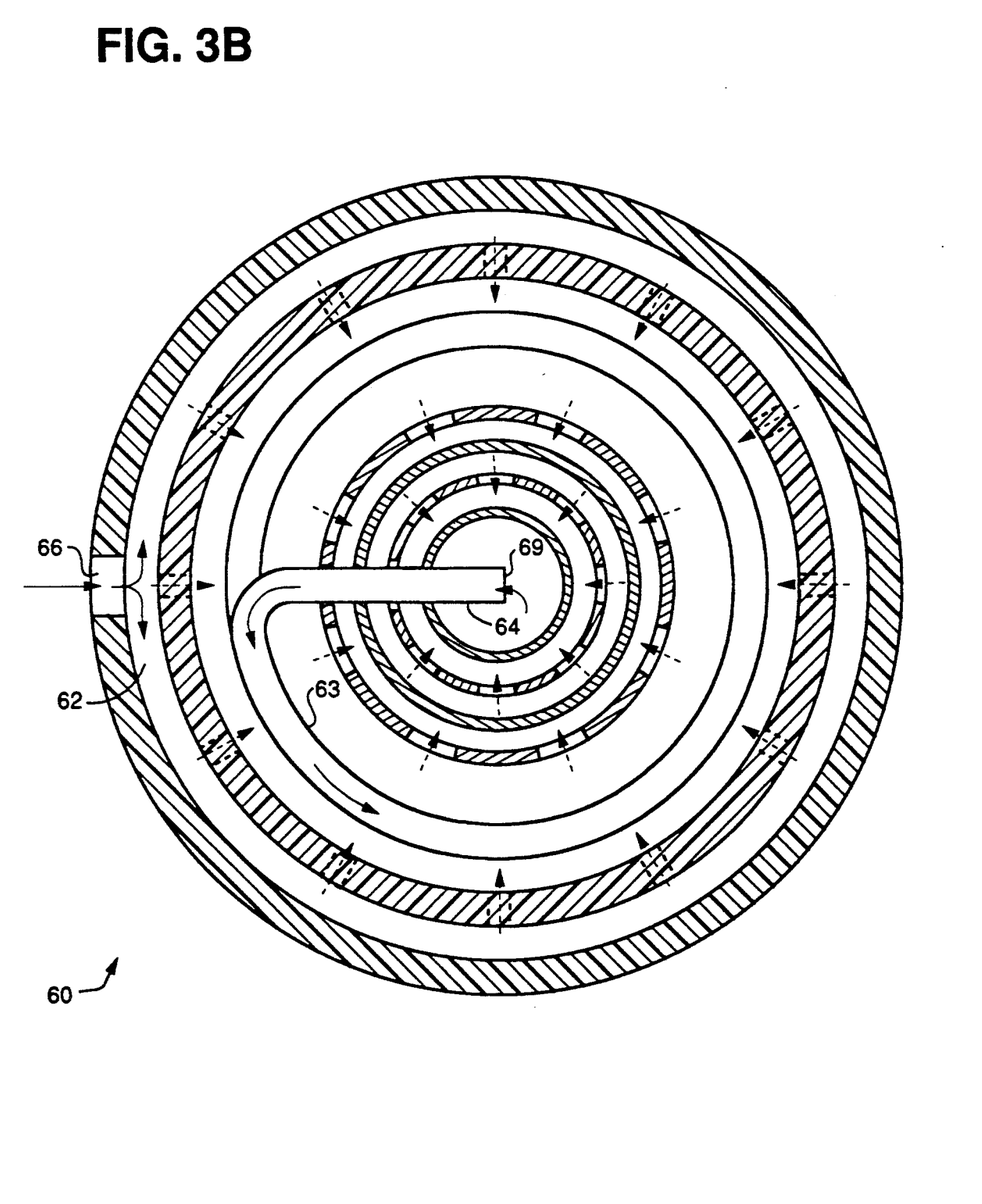
FIG. 3B is a top plan cross-sectional view of the freeze-thaw air dryer of FIG. 4A, illustrating the generally centripetal airflow path terminating at the entrance of the dry air extraction outlet tube, and the dry air extraction outlet tube thence forming a helical pre-cooling coil, this view taken along line 3B—3B of FIG. 3A.

FIG. 3B is a top plan cross-sectional view of the freeze-thaw air dryer 60 of FIG. 3A, illustrating the generally centripetal airflow path terminating at the entrance 69 of the dry air extraction outlet tube 64, with the dry air extraction outlet tube thence forming a helical pre-cooling coil 63. This view is taken along line 3B—3B of FIG. 3A.

Figure 4:
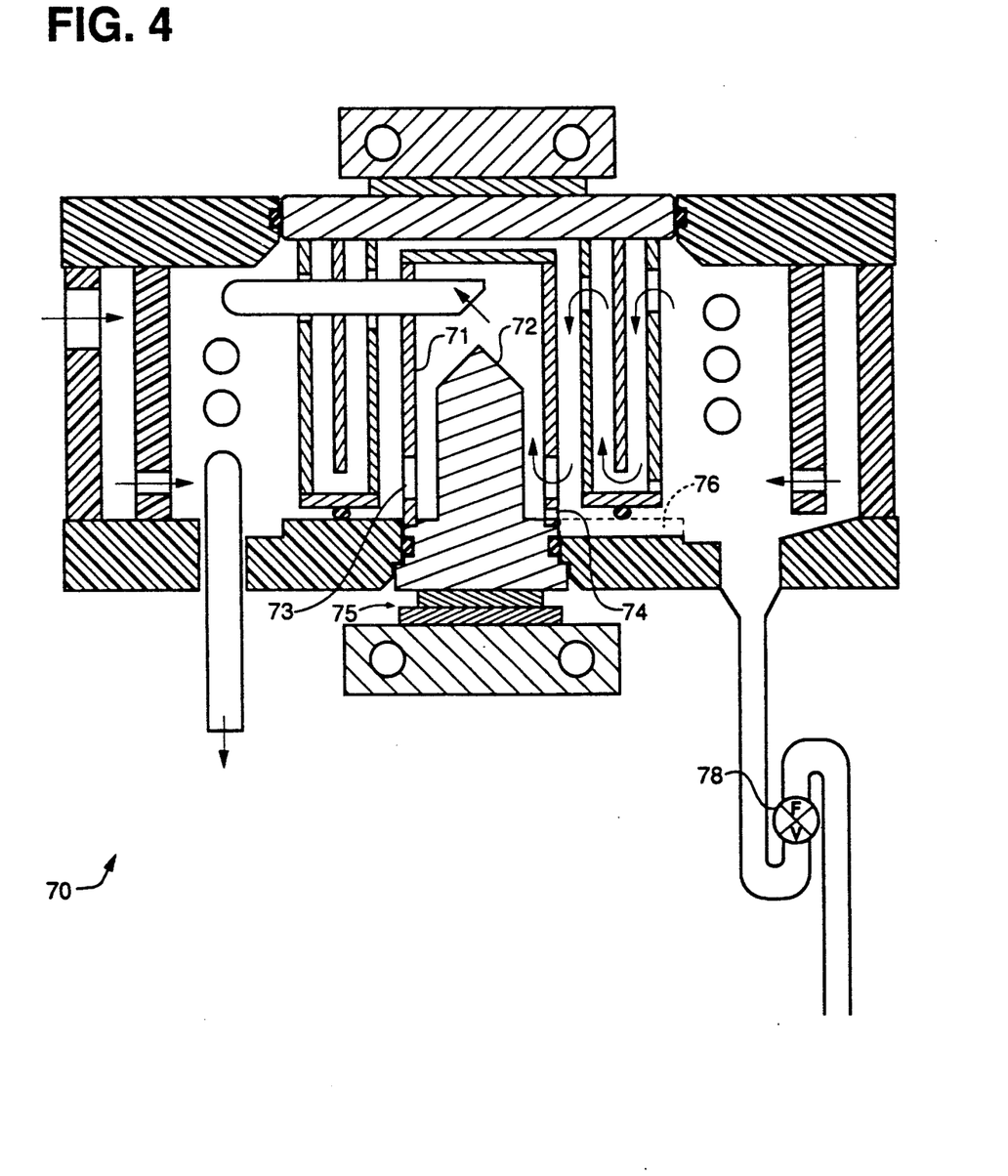
FIG. 4 is a side elevation cross-sectional view of a modified embodiment of the freeze-thaw air dryer of this invention, illustrating the addition of a secondary freezing surface array including a cascaded heat pump, and a float valve in a loop section of the drain.

FIG. 4 is a side elevation cross-sectional view of a modified embodiment 70 of the freeze-thaw air dryer of this invention, illustrating the addition of a secondary and inner freezing surface array 71, which includes a central freezing element 72, airflow inlet openings 73, drainage opening 74, and its own heat pump 75 (optionally cascaded as shown). For relatively low airflows, this "box within a box" configuration provides lower freezing temperatures and therefore dryer air at the output. Central freezing element 72 could comprise a post, hollow post, fluted or grooved post, a pin-fin array, or any other configuration, as appropriate. Also provided is drainage channel 76, and a float valve 78 in the loop section of the drain. Float valve 78 fulfills the same functions as does the check valve in FIG. 3A.

Figure 5:
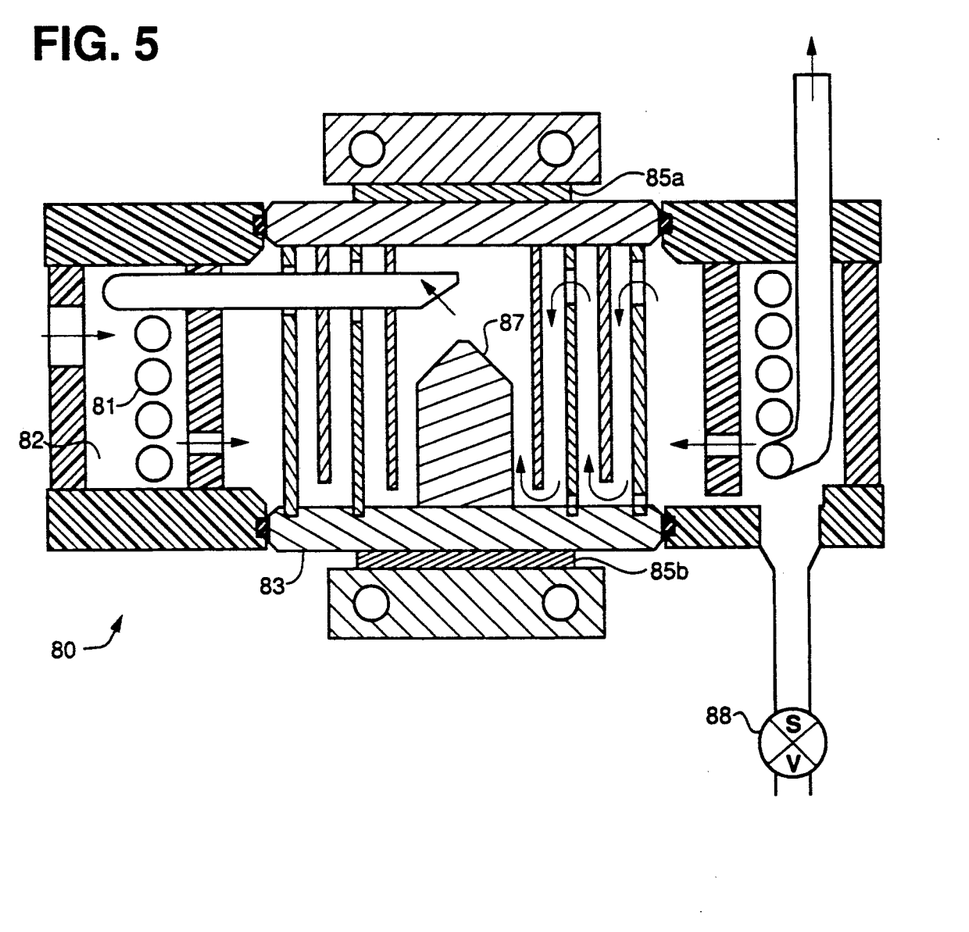
FIG. 5 is a side elevation cross-sectional view of a modified embodiment of the freeze-thaw air dryer of this invention, illustrating the placement of the pre-cooling coil within the incoming air distribution manifold, the use of two heat pumps, one on either side of the freezing surface array, and a solenoid valve drain.

FIG. 5 is a side elevation cross-sectional view of a modified embodiment 80 of the freeze-thaw air dryer of this invention, illustrating an alternate placement of the pre-cooling coil 81 within the annular incoming air distribution manifold 82, a bottom freezing surface 83 having one face outside of the housing, the use of two heat pumps, 85a and 85b, one on either side of the freezing surface array, a central freezing element 87 and a solenoid drain valve 88. The solenoid drain valve allows the operation of the air dryer at any air pressure.

Figure 6:
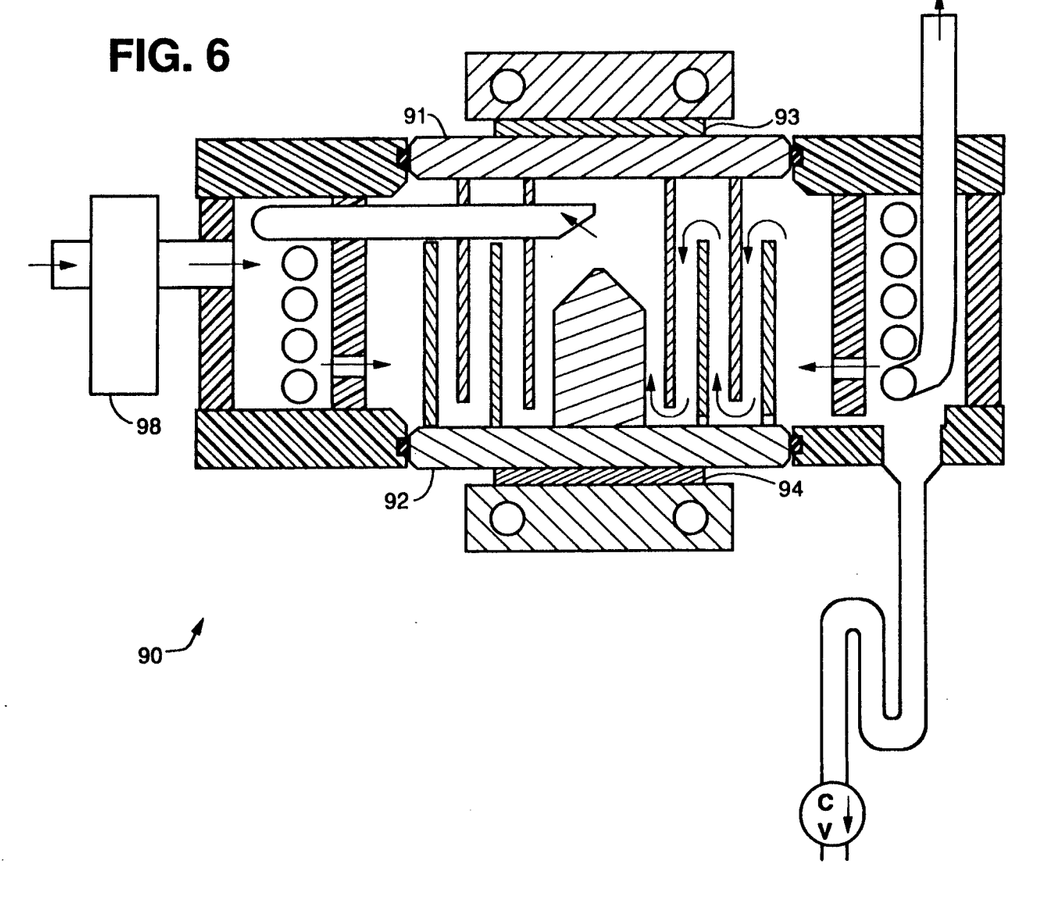
FIG. 6 is a side elevation cross-sectional view of a modified embodiment of the freeze-thaw air dryer of this invention, illustrating two interdigitated arrays of concentric tubes defining the freezing surfaces and airflow path, each array cooled by its own thermoelectric module.

FIG. 6 is a side elevation cross-sectional view of a modified embodiment 90 of the freeze-thaw air dryer of this invention, illustrating two interdigitated freezing arrays 91, 92 (each comprising concentric tubes attached to a plate) defining the freezing surfaces and airflow path, each array cooled by its own thermoelectric module 93, 94 respectively. These interdigitated arrays are easier to manufacture and assemble than the arrays shown in FIGS. 1-5. This view also illustrates an optional air filter 98 for filtering the incoming air.

Figure 7:
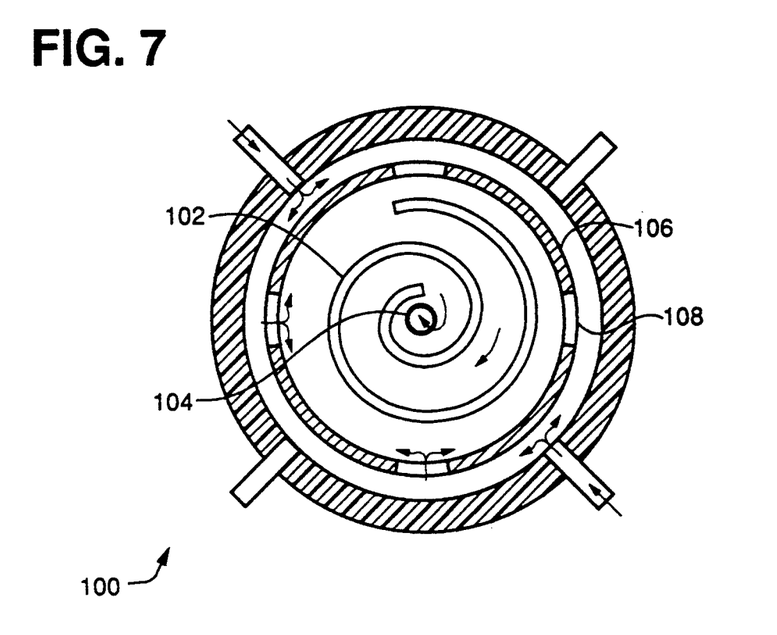
FIG. 7 is a top plan cross-sectional view of a modified embodiment of the freeze-thaw air dryer of this invention, illustrating the use of a spiral freezing surface, with an optional tubular outer freezing surface.

FIG. 7 is a top plan cross-sectional view of a modified embodiment 100 of the freeze-thaw air dryer of this invention, illustrating the use of a spiral freezing surface 102, dry air extraction tube 104, and an optional outer tube freezing surface 106 which may contain holes or slots 108. Such a spiral freezing surface could alternatively comprise a multiple spiral, and/or include corrugations or other surface features, to optimize freezing efficiency.

Figure 8:
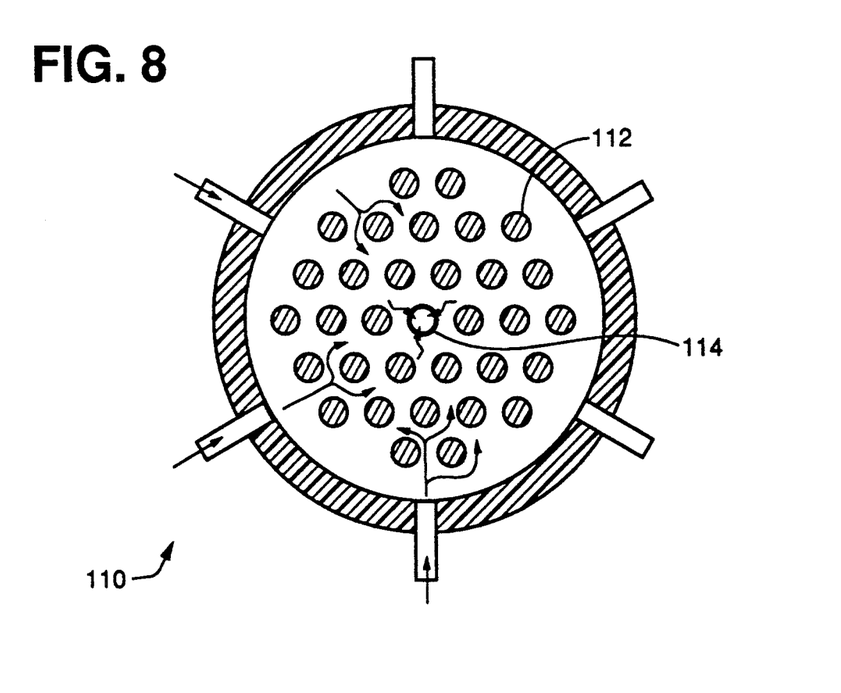
FIG. 8 is a top plan cross-sectional view of a modified embodiment of the freeze-thaw air dryer of this invention, illustrating the use of a plurality of pin-fin elements as freezing surfaces.

FIG. 8 is a top plan cross-sectional view of a modified embodiment 110 of the freeze-thaw air dryer of this invention, illustrating the use of a plurality of pin-fin elements 112 as freezing surfaces, and showing dry air extraction tube 114. The pin-fins could alternatively have any cross-sectional shape, such as triangular, square, or even irregular. Furthermore, this embodiment could include an outer tube (or tubes) freezing surface, similar to tube 106 in FIG. 7, and/or could include a planar or annular air distribution means and/or a pre-cooling means. The pin-fins could be attached to top and/or bottom freezing surfaces or plates and suspended in a housing, analogous to the embodiments illustrated by FIGS. 1, 2, 3, 5 or 6. In general, any of the embodiments of the present invention may utilize any combination of concentric tubes, either interdigitated or with staggered ends and/or staggered openings, or with posts, pins, spirals or other structures to achieve their freezing surfaces.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as my invention is:

1. An air dryer for removing moisture from air, said air dryer comprising:
   a housing member;
   at least one air inlet in said housing member;
   at least one freezing surface in said housing member, said freezing surface including a primary freezing surface generally surrounding a secondary freezing surface, said freezing surface defining an internal volume having a generally centripetal airflow path, said airflow path having a generally central terminus, said freezing surface including thermal means for selectively providing a generally centripetal temperature gradient;
   a dry air extraction outlet proximate said airflow path terminus; and
   drain means for removal of liquid from said housing member.

2. The air dryer of claim 1 wherein said secondary freezing surface comprises a generally enclosed internal volume.

3. The air dryer of claim 1 wherein said thermal means comprises a cold source, said cold source including control means for periodic deactivation.

4. The air dryer of claim 1 wherein said thermal means comprises a heat pump, said heat pump including control means for selectively providing thermal cooling and thermal heating to said freezing surface.

5. The air dryer of claim 4 wherein said heat pump comprises a thermoelectric module driven by a DC voltage, and further including means to reverse the polarity of said DC voltage.

6. The air dryer of claim 4 wherein said control means comprises a timer.

7. The air dryer of claim 4 wherein said control means comprises a temperature detector.

8. The air dryer of claim 1 wherein said air inlet includes a means for air distribution.

9. The air dryer of claim 1 including an air pre-cooling means proximate said air inlet, said air pre-cooling means connected to said dry air extraction outlet.

10. The air dryer of claim 1 wherein said thermal means is connected to a heat exchange element outside of said housing member.

11. The air dryer of claim 1 wherein said freezing surface comprises a plurality of concentric surfaces.

12. The air dryer of claim 11 wherein said concentric surfaces include staggered openings.

13. The air dryer of claim 11 wherein said freezing surface comprises interdigitated arrays of concentric tubes.

14. The air dryer of claim 1 wherein said freezing surface comprises a spiral surface.

15. The air dryer of claim 1 wherein said freezing surface comprises a plurality of pin members.

16. The air dryer of claim 1 wherein said thermal means includes a plurality of cold sources.

17. The air dryer of claim 1 wherein said drain means includes a check valve.

18. The air dryer of claim 1 wherein said drain means includes a trap.

19. The air dryer of claim 1 wherein said drain means includes a solenoid valve.

* * * * *